United States Patent [19]
Okamoto et al.

[11] Patent Number: 5,317,508
[45] Date of Patent: May 31, 1994

[54] IMAGE EDITING APPARATUS

[75] Inventors: Shusaku Okamoto, Osaka, Japan; Toshiyuki Maeda, Cheadle, United Kingdom; Fumio Maehara, Osaka, Japan

[73] Assignee: Matsushita Electric Industrial Co., Ltd., Osaka, Japan

[21] Appl. No.: 966,879

[22] Filed: Oct. 26, 1992

[30] Foreign Application Priority Data

Oct. 24, 1991 [JP] Japan .................................. 3-277432
Jan. 14, 1992 [JP] Japan .................................. 4-004524

[51] Int. Cl.$^5$ .......................... G06F 15/38; G06G 7/60
[52] U.S. Cl. ................................................ 364/419.01
[58] Field of Search ......................................... 364/419

[56] References Cited

U.S. PATENT DOCUMENTS 4,641,264  2/1987  Nitta et al. ............................ 364/419
4,984,177  1/1991  Rondel et al. ......................... 364/419

FOREIGN PATENT DOCUMENTS 1-206432  8/1989  Japan .
2-220177  9/1990  Japan .

Primary Examiner—Roy N. Envall, Jr.
Assistant Examiner—Ari M. Bai
Attorney, Agent, or Firm—Ratner & Prestia

[57] ABSTRACT

There is provided an image editing apparatus, which comprises language image uniting dictionary storing informations on words, on relation between meanings of the words, and on image, a grammer dictionary storing grammer, image editing rule and, a language parsing means to parse a linguistic sentence, an image retrieving means to retrieve image information and an image editing means to edit image, and, being input information on an intended image in natural language, parses the input sentence, retrieves images for expressing the meaning thereof, processes and snystesizes the retrieved images, all automatically, so that, an intended image can be obtained by simple operation.

21 Claims, 16 Drawing Sheets

| 901 DESCRIPTION PART OF IMAGE RETRIEVING WORD | 902 DESCRIPTION PART OF POINTER | |
|---|---|---|
| 〜 | 〜 | |
| TABLE | TABLE | —903 IMAGE RETRIEVING WORD DATA |
| ROOM | ROOM | |
| ORANGE | ORANGE | |
| APPLE | APPLE | |
| 〜 | 〜 | |
| TABLE | TABLE | |
| 〜 | 〜 | |
| TABLE | TABLE | |
| ROOM | ROOM | |
| 〜 | 〜 | |
| APPLE | APPLE | |
| ORANGE | ORANGE | |
| ROOM | ROOM | |
| ORANGE | ORANGE | |
| 〜 | 〜 | |

FIG. 9

(C#table) ←1001
   (SuperClass C#furniture) ←1002
   (SubClass nil) ———— 1003
   (Image M#table1 M#table2 M#table3~) ←1004
   (Slot) ——1005
     (Position P_on P_under P_right P_left)
     (DefaultBG(default_bg(C#room in))) ←1011
   (Method) ←1006
     (ComposeParts(Relation Class)
       (Relation on(PutImageClass.image P_on))
       (Relation under(PutImageClass.image P_under))

(Relation left(PutImageClass.image P_left))

FIG. 10

(C#room) ←1001
   (SuperClassC#house) ←1002
   (SubClassC#kitchenC#Living roomC#Bedroom) ←1003
   (ImageM#room1 M#room2 M#room3~) ——1004
   (Slot) ——1005
     (Position P_in P_ceiling P_wall P_floor P_window)

(Method) ←1006
     (ComposeParts(RelationClass)
     (Relation in)
       (ClassC#Illuminator(PutImageClass.imageP_ceiling))
       (Class(C#ClockC#Pictures(PutImageClass.image P_wall))
       (Class(C#TableC#Chair)(PutImageClass.image P_floor))
       (ClassC#  (PutImageClass.image P_window))
       (Class default(PutImageClass.image P_in))

(Relation ceiling(PutImageClass.image P_ceiling))

(Relation window(PutImageClass.image P_window))

FIG. 11

```
(C#apple)─1001
    (SuperClassC#fruit)─1002
    (SubClass nil)──1003
    (ImageM#apple1M#apple2M#apple3~)─1004
    (Slot)──1005
        (Position P_right P_left)
        (DefaultBG(default_bg nil))─1011

(Method)─1006
        (ComposeParts(Relation Class)
            (Relation(PutImageClass.Image P_right))
            (Relation(PutImageClass.Image P_left))
```

FIG. 12

```
(C#orange)─1001
    (SuperClassC#fruit)─1002
    (SubClass nil)──1003
    (ImageM#orange1 IM#orange2 M#orange3~)─1004
    (Slot)──1005
        (Position P_right P_left)──1011
        (DefaultBG(default_bg nil))

(Method)─1006
        (ComposeParts(RelationClass)
            (Relation(PutImageClass.Image P_right))
            (Relation(PutImageClass.Image P_left))
```

FIG. 13

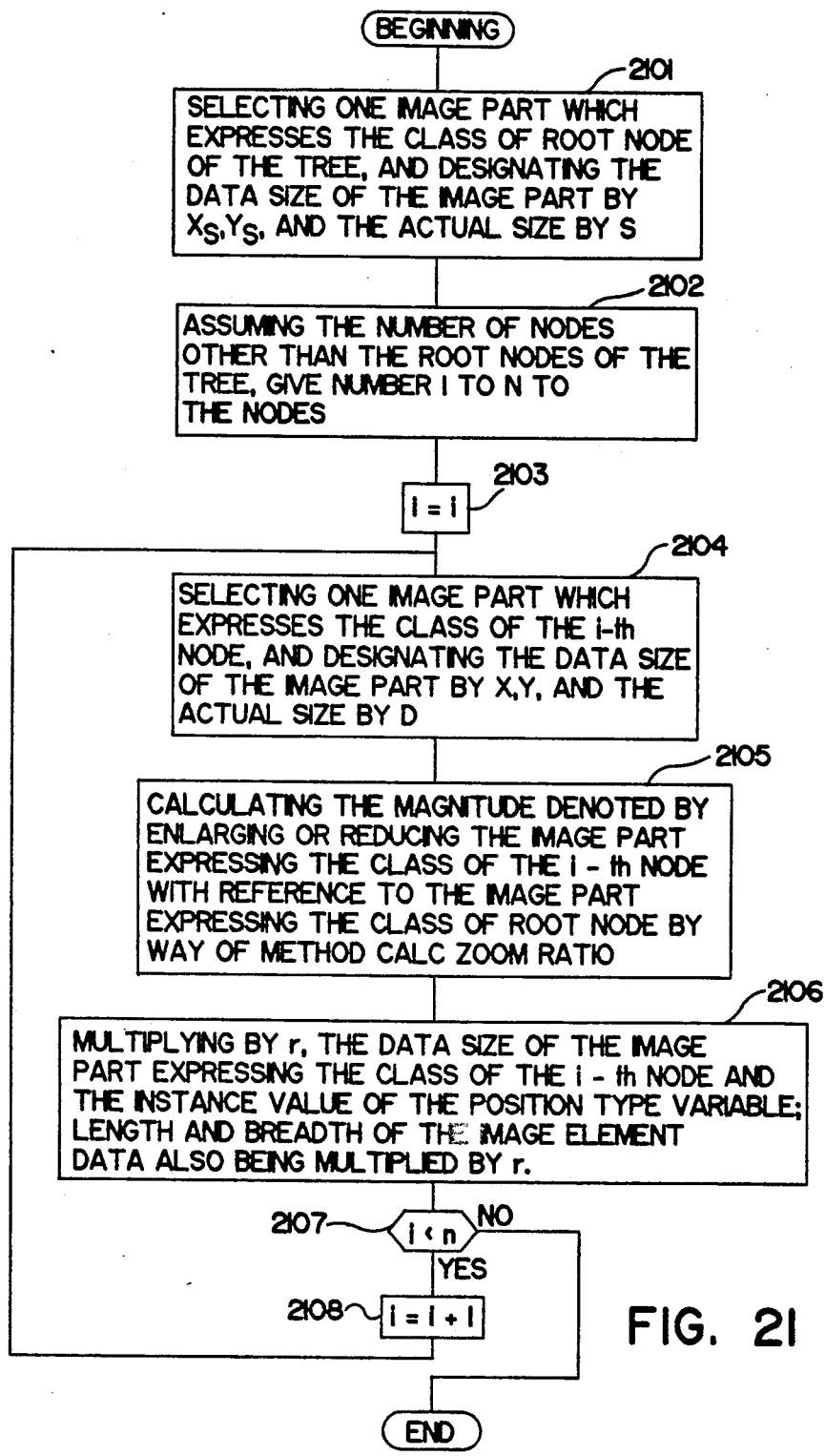

IMAGE EDITING APPARATUS

BACKGROUND OF THE INVENTION

1. Field of the Invention

This invention relates to an image editing apparatus for retrieving and processing plural image parts and synthesizing them to a synthesized image, especially to the one to transfer the contents of natural language imput to a synthesized image.

2. Description of the Prior Art

In recent years, with the spread of word processor, it became possible for anybody to make a document so pretty as typeprinting. And, keeping step with this, there is eager demand for a function as to make easily illustration or synthesized image and take it into a document prepared by the word processor.

While, it has been put to practical use to arrange plural image parts on a background image and to edit to one synthesized image.

As a rudimentary method, in the past, functions to draw elementary figures such as a straight line, curve or circle and functions capable of applying simple process thereto were prepared, and these functions were properly combind to make various illustrations or figures. Further, it has been also practiced to store as parts the illustrations, figures or images made by the above described functions, to utilize again to improve the operation efficieny.

For the forming of more complicated synthesized image, it has been necessary, as a rule to store parts of images, to take out them by retrieving, and to combine and edit them retouching the parts or synthesizede images, if necessary.

Referring to the storing and retrieving of image parts, which comprises preparing plural image parts and background images and retrieving them one by one in accordance with the necessity for editing, various methods have been used; a method to use key words, and a method to store the images arranging them to upper and lower class relation, and to trace the relation looking at retrieved images from the top of the class relation to narrow down to the intended image.

As for editing, a procedure to enlarge or to reduce, for example, these background images and image parts, and a procedure to synthesize the parts on the background images were made independently by human agency, requiring complicated operation of input apparatus of a key board or mouse.

As an antecedent of an image editing apparatus using such method, Inoue, Shibata, and Nakasu, Filing system of image parts for image synthesis. The Trans. of the Inst. of Electronics, Informations and Communication Engineers (of Japan) Vol.J72-D II, No.11, PP.1824–1832 (1989-11), for example, can be mentioned.

However, with these method, to retrieve an intended image was not easy, since, by the keyword method matching of keyword needs very long time as the storing of image parts becomes large, and, by the method to arrange images according to their upper and lower relation the performace of the image data base depends much upon the person who prepares it.

With respect to editing, the retrieving, processing and synthesizing of the background images and image parts have to be made independently and inefficiently by hand work, and they required complex operation of various input apparatus as a keyboard or mouse, resulting in quite troublesome work, so that to make an expert of the operation long time of training were necessary.

SUMMARY OF THE INVENTION

An image editing apparatus is disclosed in which the retrieving, processing and synthesizing are automatically made by inputting into the apparatus the contents of the intended image by natural language, to attain efficient and easy image editing.

The image editing apparatus according to a first embodiment of the present invention comprises:

a first storing means to store information of simple words which form a linguistic sentence, and information on relation of meaning between the simple words, a second storing means to store information solely on attributes of images or image information on attributes of images and data of image elements combined, a third storing means to store the grammar of the language, a fourth storing means to store the relation between the information stored in the first storing means and that stored in the second storing means, if any relation exists, a fifth storing means to store image editing rule to edit images using the result of parsing of the language and the image attribute, a linguistic sentence input means to input linguistic sentence, a linguistic sentence parsing means to parse a linguistic sentence using the information stored in the first and third storing means, an image retrieving means to retrieve image information from the second storing means using the parsing result of the linguistic sentence parsing means and the information stored in the first and the fourth storing means, a displaying means to display the image element data stored in the second storing means, and an image editing means to input the linguistic sentence by the linguistic sentence input means, to parse the linguistic sentence by the linguistic sentence parsing means, to retrieve image information relating to the linguistic sentence by the image retrieving means using the parsing result of the linguistic sentence, to conjecture, using the parsing result of the linguistic sentence, the retrieved image information, and the information stored in the fifth storing means, whether the editing, of the meaning of the input linguistic sentence to an image is possible, and, in case it is possible, to process and synthesize the retrieved image to edit an image showing the meaning of the input sentence.

The image editing apparatus according to the first embodiment of the present invention organized as described above, getting information of the contents of the intended image through natural language sentence, parses the input sentence, retrieves the image necessary for expressing the meaning or contents, and processes and synthesizes the retrieved images, all automatically, to obtain the image expressing the contents of the input sentence. If the obtained image does not match to the image intended, it can be adjusted.

An image editing apparatus according to the second invention of the present invention comprises:

a parsing dictionary, to store information necessary to understand a linguistic sentence, an image data storing-arranging means to store and arrange image parts and steps of processing the image parts, a language input means to have input of linguistic sentence, a parsing means to parse the linguistic sentence, using the parsing dictionary and the information stored in the image data storing-arranging means, an image editing means to retrieve, with the parsed result of the linguistic sentence, image parts necessary for expressing the contents of the linguistic sentence and steps to process the image parts from the image data storing-arranging means, and a displaying means to display the image parts.

The image editing apparatus according to a second embodiment of the present invention organized as described above, given information of the contents of the intended image, draws out a noun representing the object which are pictorially expressible, information to show attributes of the object, and relation among the objects, using the information stored in the dictionary and the image data storing-arranging means, and the parsing means. Then, the apparatus, exploiting the result drawn out by the parsing means, retrieves, by the image synthesizing means, the image parts for the object and the method to process and synthesize the image parts. Lastly, with the said method, the apparatus retrieves, processes, and synthesizes the image parts retrieved by the image processing-synthesizing means, and synthesizes automatically an image expressing the contents of the input sentence.

The common features of first and second embodiments of the present invention are that, by an input of natural language, necessary informations of background image and image parts are retrieved, and processed if necessary, and synthesized, all automafically, and the finished image can be further processed.

Also, as the image edited by the above described procedure is represented only by basic data showing not-yet-edited material images used for the editing, and processing, and synthesizing method thereof, and, as image element data are not used, small capacity of the memory for storing edited image is enough, resulting in economy of memory in hardware.

BRIEF DESCRIPTION OF THE INVENTION

FIG. 9 is a table showing image retrieving dictionary in a table form.

FIG. 10 is a diagram of class data shown in a list form on an example of class data "table".

FIG. 11 is a diagram of class data shown in a list form on an example of class data "room".

FIG. 12 is a diagram of class data "apple" shown in a list form.

FIG. 13 is a diagram of class data "orange" shown in a list form.

FIG. 21 is a flow chart showing the process in image processing means.

FIG. 22 is a diagram showing a formula to calculate the magnitude of enlarging or reducing of image part as a process in the image processing means.

DESCRIPTION OF THE PREFERED EMBODIMENT OF THE INVENTION

Now, referring to drawings, an embodiment of the present invention is explained below.

Figure 1:
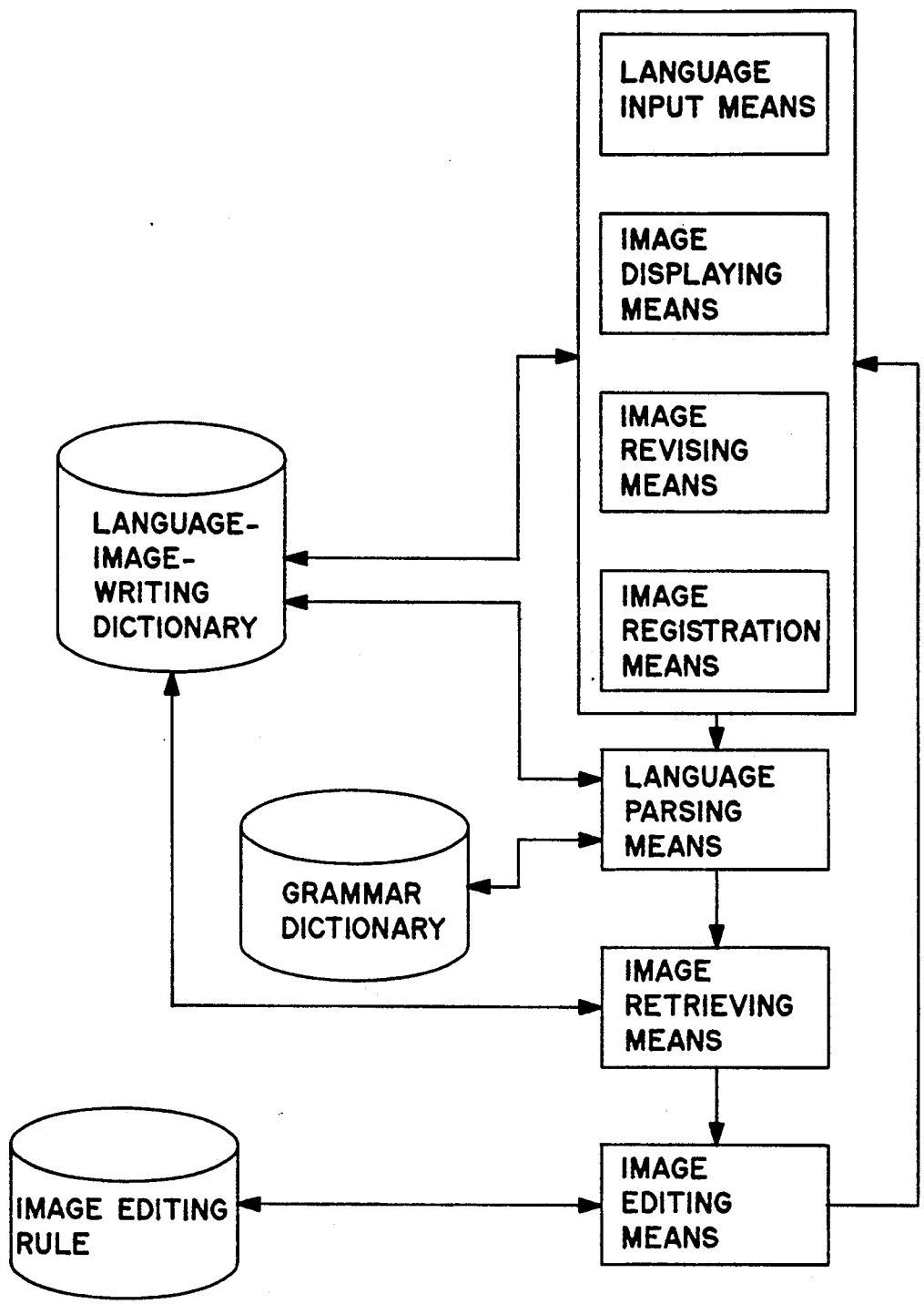
FIG. 1 is a block diagram showing an example of structure of an image editing apparatus according to the firsr invention of the present invention.

FIG. 1 shows a block diagram of hardwave structure of an embodiment of an image editing appatatus according to the present inventions.

The apparatus includes a language-image-uniting dictionary 101 consisting of; a first storing means, a second storing means; and a fourth storing means; a grammer dictionary 102 which is also a third storing means; an image editing rule 103 which is also a fifth storing means, and they are put together in a storing media such as a hard disk. The image editing apparatus further includes; a language inputting means 104 with which the user inputs information by means such as a keyboard, combination of acoustic input means and speech recognition means as well as a keyboard; an image displaying means 105 which displays edited image; an image revising means 106 with which the user revises the image; an image registrating means 107 which registrates the edited images; a parsing means which parses a sentence being input by the language inputting means 104, using the language-image-uniting dictionary 101 and the grammer dictionary 102; an image retriving means 109 which retrieves an image information using the result of parsing of input sentence; and an image editing means 110 which edits the image, using the parsing result of the input sentence, retrived image information and the image editing rule 103 and, based upon the meaning and contents of input sentence.

Figure 2:
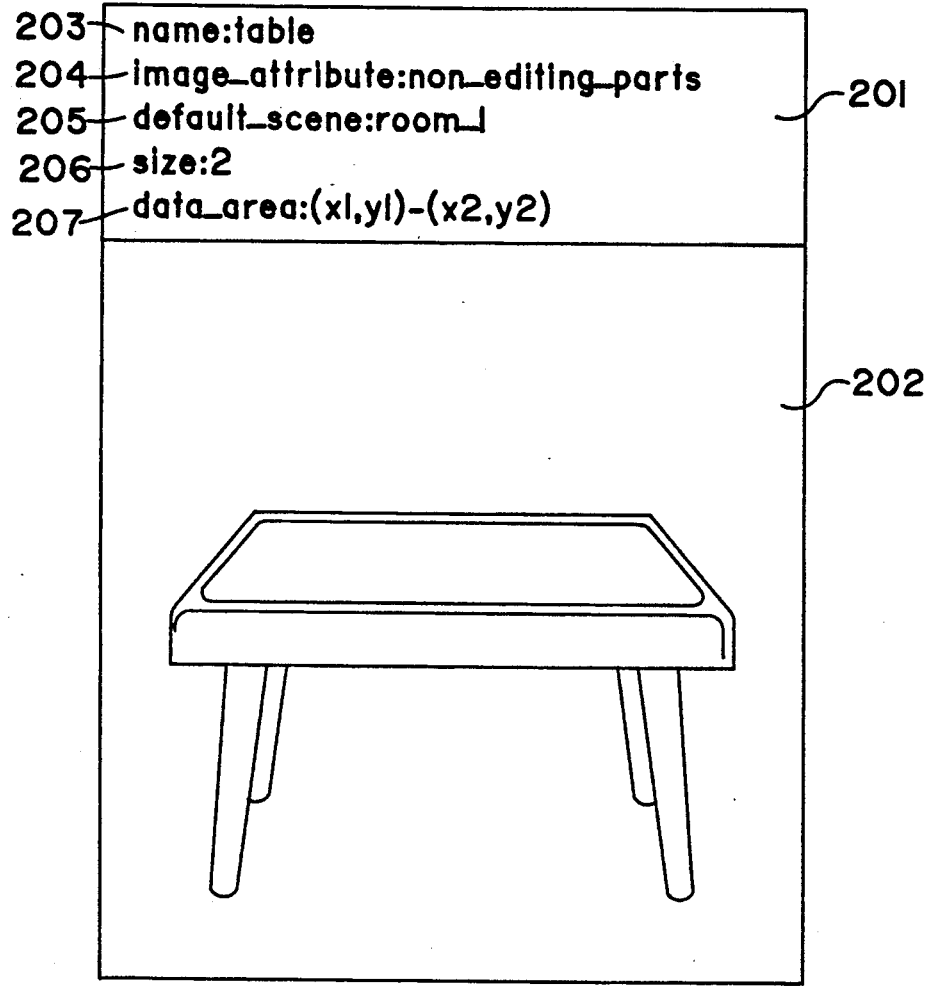
FIG. 2 is a diagram showing the general idea of not-yet-edited image information, citing a part as an example.
Figure 3:
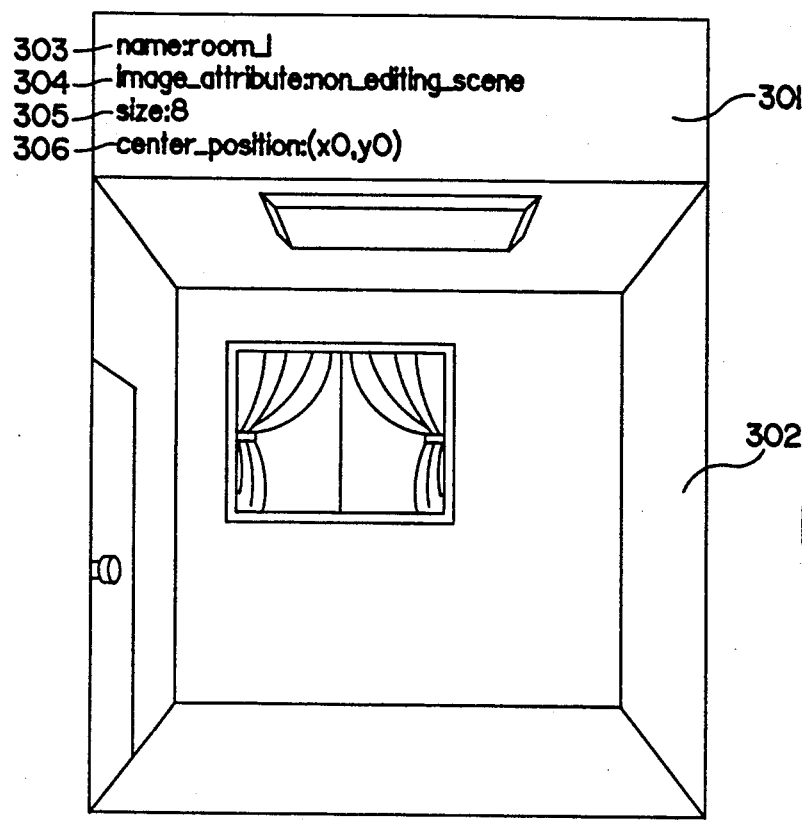
FIG. 3 is a diagram showing the general idea of not-yet-edited image information, citing a background object as an example.

FIG. 2 and FIG. 3 are examples of description of not-yet-edited image information on example of an image part and a background image respectively. The not-yet-edited image infotmation consists of instance valve (201 in FIG. 2 and 301 in FIG. 3) and image data (202 in FIG. 2 and 302 in FIG. 3). The instance value includes in case of image part, as shown in FIG. 2, name 203 of image information, image attribute 204, background image 205 of default, size 206 of the object expressed by the image, and data area 207 of the image data, for example, and, in case of background image, as shown in FIG. 3, name 303 of image information, image attribute 304, size 305 of the object expressed by the image, and the center position 306 of the image data, for example. While the image data is expressed by a line drawing for convenience of explanation in this example, data such as color information of image element or shape information is by some method like this example, tranformed to data of character and numeral, to be stored.

Figure 4:
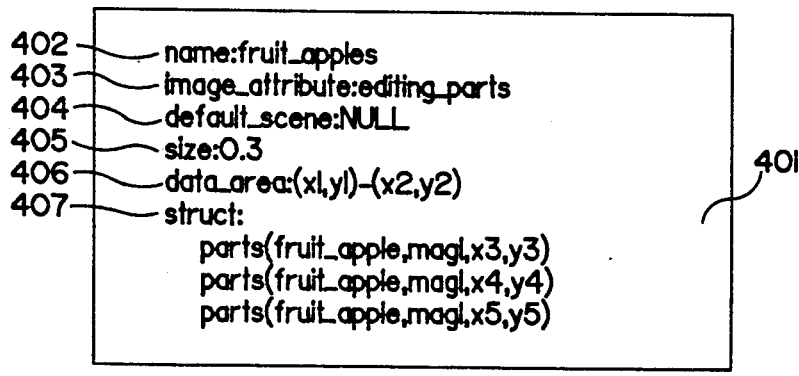
FIG. 4 is a diagram showing the general idea of edited image information, citing a part as example.
Figure 5:
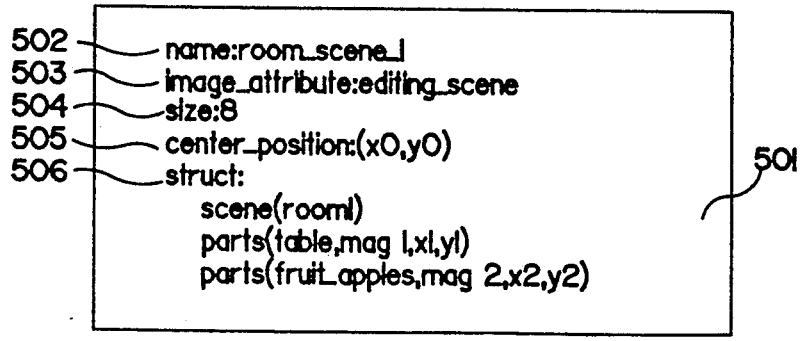
FIG. 5 is a diagram showing the general idea of edited image information, citing a background object scone as an example.

FIG. 4 and FIG. 5 show description of edited image information on examples of image part and background image respectively. The edited images are formed with attribtes 401 or 501 only. The attributes comprisis, in case of the image part, as shown in FIG. 4, name 402 of the image information, image attribute 403, background image of default and its position 404, size 405 of the object expressed by the image, data area 406, and location 407 of the images used for editing, and, in case of the background image, as shown in FIG. 5, name 502 of the image information, image attribute 503, size 504 of the object expressed in the image center position 505 of the image data, and location 506 of the images used for editing.

Figure 6:
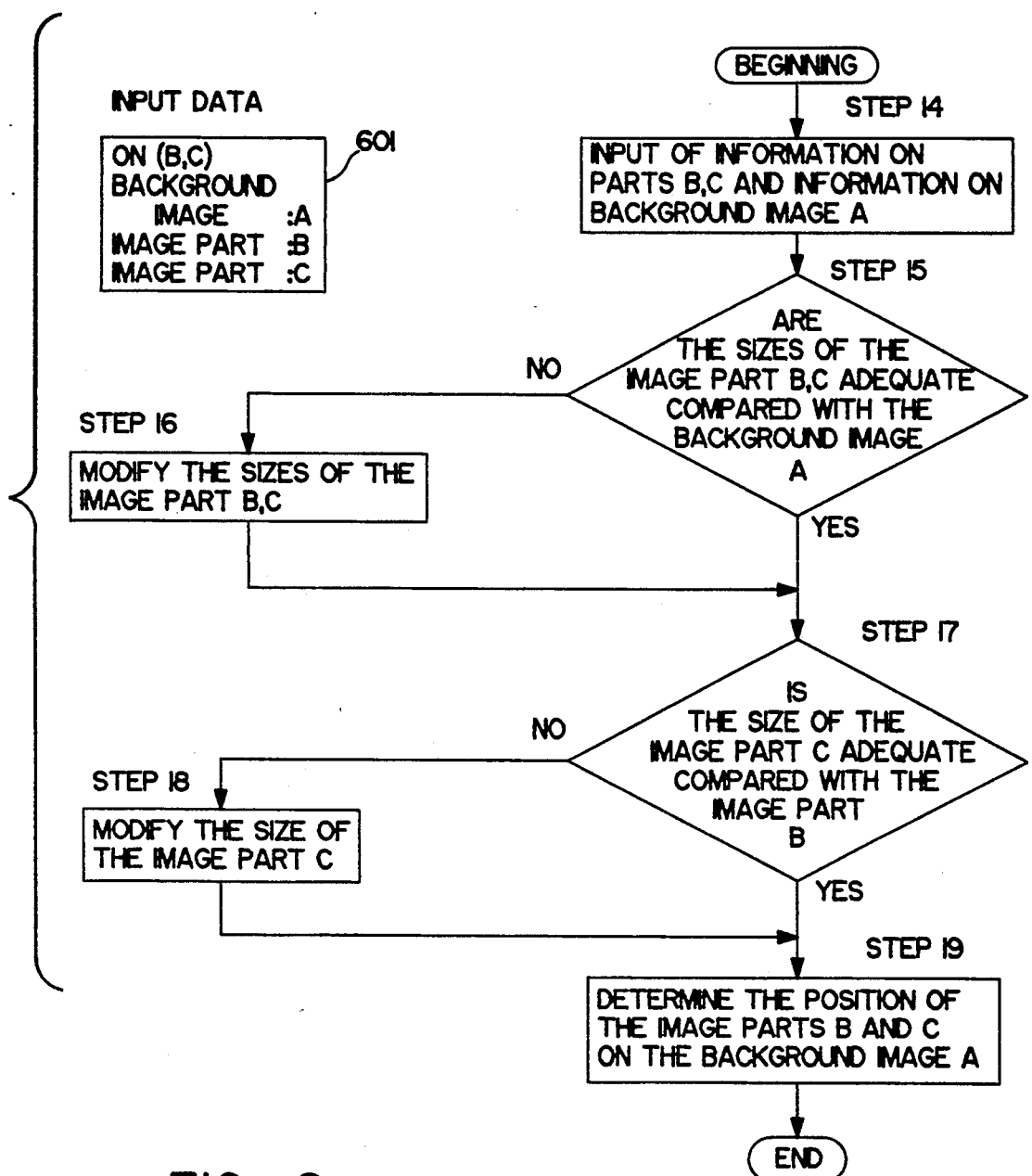
FIG. 6 is a flow chart showing an example of image editing rule of the present invention.

FIG. 6 shows an example of image editing rule 103 as a flow chart, in which enlarging, reducing and positioning among editing procedure are made. In the following, an example of the procedure is explained, which, starting from the relation "There is a C on the B which is in the A", enlarge B and reduce C, arrange B in A, and put C on B.

First, image information and result of parsing input sentence which are necessary for editing procedure are input (Step 14). As the result of parsing, formula (4) for example shown later is used. Input data 601 is expressed in FIG. 6 for easy understanding.

Then, whether the sizes of B and C is appopriate with reference to the background image A is judged considering attributes of A, B and C (Step 15). If it is appropriate, the procedure jumps to step 17, and, if not, it jumps to step 16 and, after adjusting the size of image information B and C, jumps to Step 17. Further, it is judged (Step 17) referring to instance value of image information B and C, whether the size of C is adequate or not compared with B. If it is so, the procedure jumps to Step 19, and if not, to Step 18 and, adjusting the size of image part C, to Stop 19. Lastly position of image part B is determined so as to satify positinal relation "in" with reference to the background image A, and position of image position C is determined so as to satisfy positional relation "on" with referene to the image position B. In this case, though not shown by the image parts in FIG. 2 and FIG. 3, it is preferred to describe in A and B the positions of default corresponding to the positional relation "in" and "on", and to determine the position B and C so as to match to the input positinal relation. The resuts is represented, for example, as formula (1);

scene (A)

parts (B, mag1, x1, y)

parts (C, mag2, x2, y)  (1)

The meaning of formula (1) is;
Designate the background image A
Reduce image part B by the factor mag 1, and put at (x1, y) on the background image A.
Reduce image part C by the factor mag 2, and put at (x2, Y) on the background image A.

The editing rule was shown by a flow chart in this case for convenience of explanation. Usually, such control is transferred to a program by using procedural language or logic language and put into the apparatus.

Figure 7:
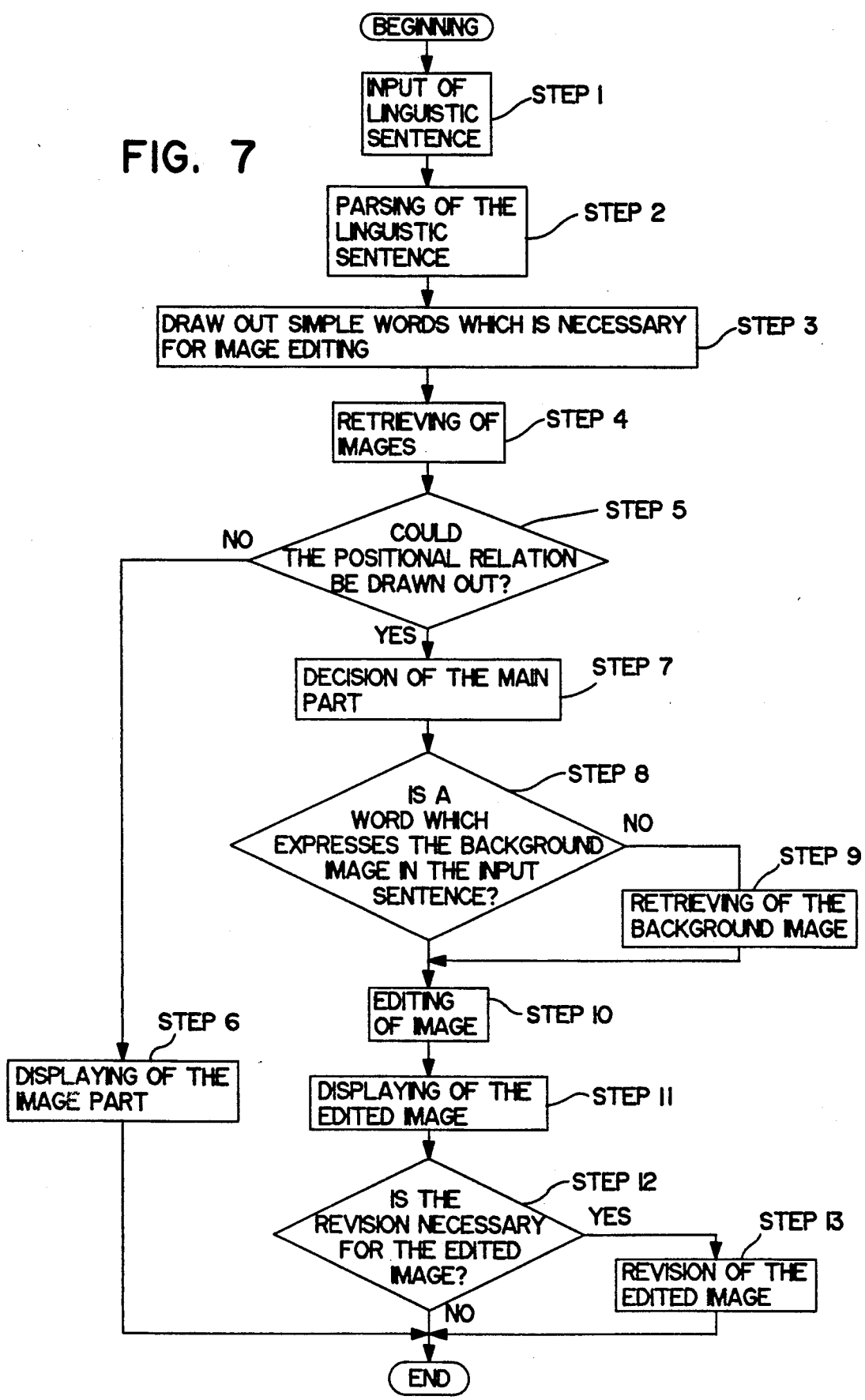
FIG. 7 is a flow chart showing the procedure of processes of image editing by the image editing apparatus according to present invention.

An example of procedure of image editing by use of image editing apparatus as constructed as described is explained below, referring to the flow chart of FIG. 7. The example of input sentence is:

"There is an apple on the table"  (2)

First, the procedure up to the parsing of input sentence and retrieving of image is explained. The natural language sentence (2) is input by the language input means 104, and sent to the language parsing means 108 (Step 1), where the input language (2) is parsed with the language-image-uniting dictionary 101 and the grammer dictionary 102 (Step 2), to draw out (Step 3) simple words "table" and "apple" necessary for the image editing.

In the parsing means 108, input sentence (2) is parsed with the grammar dictionary 102, an example of which is as follows:

S → NP VP
VP → VP PP
VP → V NP
VP → V
NP → NP PP
NP → Ar NP
NP → A NP
NP → N NP
NP → N
PP → P NP

N → There
V → is
Ar → an
N → apple
P → on
Ar → the
N → table where

Non-terminal symbol
S: Sentence
NP: Noun Phrase
VP: Verb Phrase
PP: Preposition Phrase Terminal symbol
{
Ar: Article
A: Adjuctive
N: Noun
P: Preposition
V: Verb
}

If a sentence "S" is inputted, it is parsed, according to the above grammar, into non-terminal symbol "NP", "VP", etc., and, by being parsed further to terminal symbol such as "N", "V", it is received as a sentence.

Figure 28:
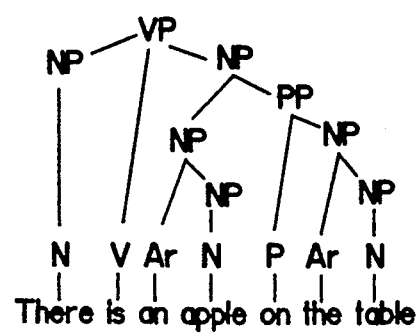
FIG. 28 is a diagram illustrating an exemplary parsing algorithm for use in grammar dictionary 102.

The sentence (2) is parsed as shown in FIG. 28 and, by matching the words "There", "apple", and "table" with the language-image uniting dictionary, "apple" and and "table" which are expressible as images are drawn out.

With the image retrieving means 109, images expressing the drawn simple words are retrieved (Step 4). Further, with the parsing result obtained at Step 2, it is checked whether the positional relation of the simple word drawn out at the Step 3 is drawn or not (Step 5). For example, the result obtained by parsing the input sentence (2) and by drawing the simple word necessary for image editing and the positional relation thereof is expressed as follows;

Attribute (B, table)

Attribute (C, apple)

on (B, C)            (3)

If the positional relation is not drawn at Step 5, the procedure jumps to step 6, where the images drawn at Step 4 are all expressed, to finish the procedure.

The preliminary process of image editing at the image editing means is explained below.

First, from the parsing result (3) image information which is to become a main part is determined (Step 7). The main part means an image part which works as base when parts are arranged on a background image. In the case of sentence (2), as is understood from the parsing result (3), "table" is the base for arranging "apple", so that, "table" becomes the main part.

Then, from the parsing result, whether any image which is to be a background image exists is checked (Step 8). If it is not found, the background image to be used as default is retrieved from the attributes in the image information of the main part (Step 9), and the procedure jumps to Step 10. If it is found, the procedure jumps to Step 10, where, if the example of the figure is adopted as the image information of "table", "room" is obtained as the background image information. Thus, the following data necessary for image editing is obtained.

Attribute (B, table)

Attribute (C, apple)

Attribute (A, room)

scene (A)

main_part (B)

sub_part (C)

in (A, B)

on (B, C)            (4)

Lastly, with data (4) appled as input, editing procedure of image is carried out by an image editing means 110. In the image editing means 110, the image editing rule 103 (as shown by example in FIG. 6) is called from "on (B, C)" among the input data (4), and the arrangment data (1) of image parts on the image part A results (Step 10). Further, by the arrangement data (1), the edited image is displayed by the image displaying means 105 (step 11). Whether the obtaind image is satisfactory is judged (Step 12), and, if it is, the procedure ends. If not, the procedure jumps to Step 13, where image parts in the obtained image is retrieved—enlarged, reduced, moved, or rotated, to finish the procedure by an image revising means 106.

Thus, according to the first invention, with input in natural language representing the contents of images to be edited, intended images can be obtained automatically, reducing the load of operator in image editing.

Next, an embodiment of the image editing apparatus acoording to the second invention of the present invention is explained, referring to the drawings.

Figure 8:
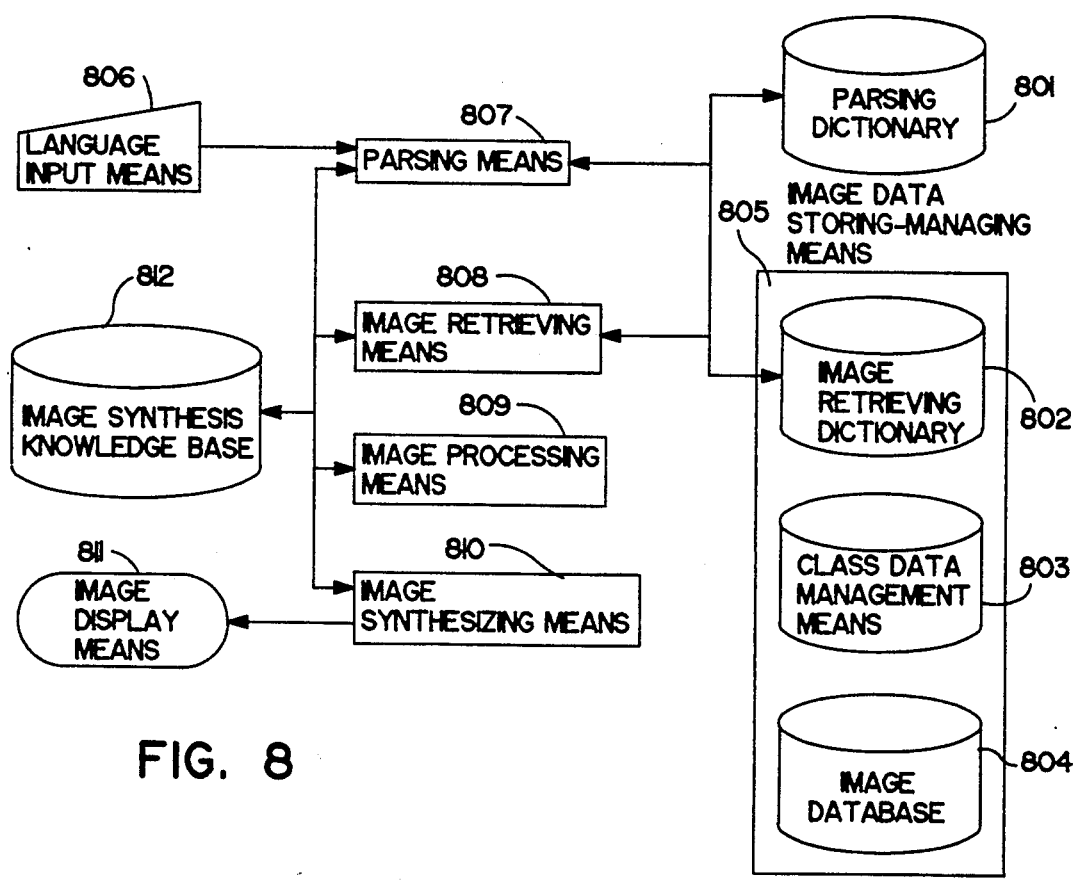
FIG. 8 is a block diagram showing a structure of an example of an image editing appartus according to the second invention of the present invention.
Figure 14:
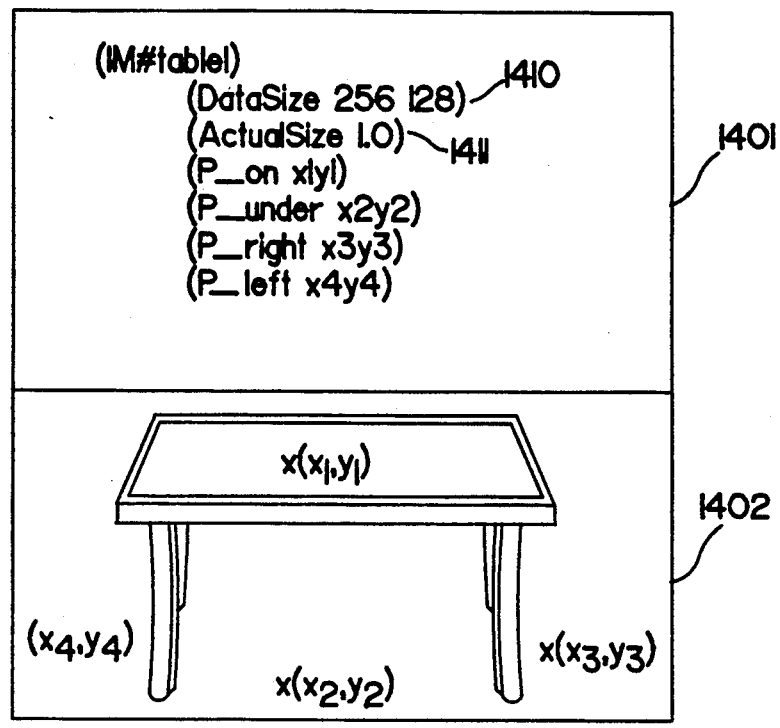
FIG. 14 is a diagram showing general idea of an image part "table".

FIG. 8 is a block diagram showing the structure of an embodiment of the image editing apparatus according to the present invention. The image editing apparatus comprises a parsing dictionary 801; an image data storing-managing means 805 comprising an image retrieving dictionary 802, a class data management system 803, and an image data base 804; language input means 806, a parsing means 807, an image retrieving means 808, an image processing means 809, an image synthesizing means 810, an image displaying means 811, and image synthesis knowledge base 812.

FIG. 9 to FIG. 11 show examples of discription of an image retrieving dictionary 802, a class data of a class-data-management system 803, and an image part of image data base 804, which constitute the image data storing-managing means 805.

FIG. 9 describes an image retrieving dictionary 802 according to the invention in table form. The image retrieving data 903 is composed of a description part 901 of the image retrieving word and a description part 902 of the pointer to appoint the class data representing the class of the image retrieving word, and, in this example, class data is used as a pointer to appoint the class data expressing the class of the image retrieving word.

When nouns which are expressible as images are registered as image retrieving data 903 in a image retrieving dictionary 802, whether an image part expressing noun exists or not is judged only if the existence of image retrieving word corresponding to the noun is searched. For example, in FIG. 9, since nouns "table", "Table", "TABLE" are all registered as image retrieving words in the image retrieving dictionary 802, the image parts expressing these nouns is judged to exist. That is, in retrieving an image part expressing "table", three simple words "table", "TABLE", and "Table" are usable. As for the method to retrieve image part expressing the above described noun, description is given later at the explanation on the image retrieving means 808.

FIG. 10 to FIG. 13 shows the class data according to the present invention in a form of list.

A class data consists of a description part 1001 of a class name, a description part 1002 of a pointer pointing the class data representing upper class, a description part 1003 of a pointer pointing the lower class, a description part 1004 of a pointer pointing an image parts expressing the substance of the said class, a description part 1006 of method to give processing to the said image part, and a description part 1005 of a variable necessary for the said method. In the following, the contents of the description parts are explained referring to the example of "table" shown in FIG. 10 and class data of room" given in FIG. 11.

"SuperClass" and "SubClass" are embodiments of the description parts (1002 and 1003) of pointers pointing the class data expressing upper class and the class data expressing lower class. In the embodiment the said name "class data" is used as a pointer to point the upper and lower class data. If any coresponding class data does not exist, it is represented by "nil". For the class data "table" in FIG. 10 "furniture" is appointed as the upper class data "SuperClass", whereas the lower class data "SubClass" is represented as nil, since it is difficult to divide "table" conceptionally further. Also, for the class data "room" in FIG. 11, "house" is appointed as the upper class data "SuperClass", and "kitchen", "living room", and "bed room" are appointed as the lower class data "SubClass".

"Image" expresses an embodiment of the description part 1004 of the pointer which points out the image part showing the actual situation of class data according to the present invention and the pointer is given the name of the file storing the data of the said image parts. In the class data "table" in FIG. 10, it is appointed as (Image IM#table1 IM#table2 IM#table3)

This means that all the character strings following the "Image" and beginning with IM# and in the parenthesis are the files including image parts expressing the class of class data, and that there are IM#table1, IM#table2, IM#table3 etc. as the file including image parts expressig "table".

"Method" represents an embodiment of the description part 1006 of method in the class data according to the present invention, and described by an format;

(name of method declaration of parameter contents of method).

In the class data "table" in FIG. 10, "ComposeParts" is the name of the method, "Relation" and "ClassName" in a following parenthesis are the parameter of the method "ComposeParts" and the parts further following up to the parenthesis coresponding to the parenthesis just before "ComposeParts". "ComposeParts" is an example of method to execute the synthesis of image automatically according to the invention, the contents of the precedure being explained later in the explanation on image synthesizing means 810.

"Slot" represents the example of the description part 1005 of variable in the class data according to the present invention, and described by a format:

(type of variable name of variable~name of variable).

If the initial value of a variable is necessary, the part of the above "name of variable" is changed to (name of variable initial value). In the class data "table" in FIG. 10, variables of three type "Posision", "DefaultBG", and "PositioningVerb" are declared.

A Variable declared by the "Position" type is used in the above described method "ComposeParts", and four types:

P_on P_under P_right and P_left are declared. As initialization is not made for them, it is necessary to appoint concrete value in the image part belonging to the class data "table".

The variable "default_bg (311) declared in "DefaultBG" type is an example of a variable for distinguishing which of the background and object is expressed by the said class data. Class data for which the variable 1011 of "DefaultBG" type is declared represents the object, and class data not declared represents the background. For the case of class data "table" in FIG. 10, the variable default_bg (1011) declared by DefaultBG type is initialized as DefaultBG (default_bg (C#room in)), This means that "table" is the foreground object and is put at "in" of "room". Also, for the class data "room" of FIG. 11, which is a class representing background object, this variable is not declared. If the background object of a class data is not appointed as "apple" of FIG. 12 or "orange" of FIG. 13, it is enough to indicate that the variable 1011 of "DefaultBG" type is declared as;

DefaultBG (default_bg nil)

This nil is used when the class data is not appointed to be at any background object. When it is requested to classify the class data into smaller groups according to attributes such as shape, color, etc., it is not necessary to make under class in the description part 1003 of the pointer apointing the class data exspressing the lower class, but it is done by declaring the variable to distinguish the said attribute at the description part 1005 of the Slot of class data, and describing concrete value of the variable at each image parts which belongs to the class data. For instance, if class data "table" needs more detailed classification referring to their shaps or colors, the variable to distinguish shape or color as (Shape shape)
(Color color)

is declared at he description part 1005 of the Slot of "table", and, at the image parts belonging to the class data "table", the concrete value of the variable is described as;

(Shape square)
(Color brown)

FIG. 14 to FIG. 17 show the general ideas of image parts used in the present invention. The image parts consists of description part 1401 of instance value and image element data 1402. In the following, with the example of a image part representing "table" shown in FIG. 14, the contents of instance value and image element data are explained.

Among the variables declared by the class data to which the image part belongs, not-initialized one is given concrete value, by the description part 1401 of instance value. In the present case, concrete values are given to the four variables not-yet-initialzed by the class data "table" in FIG. 10. Further, in the image part to express "table", concrete values are given to the two variables, data_size and actual_size (1410, 1411). These are the example of variable 1410 (data-size) representing the size of image element data of image part and variable 1411 (actual_size) representing the size of the object represented by the picture parts according to the invention, and they are not declared in the class data "table" to which the image part belongs. They are special variables inherent to the all image parts, declared at the class data at the top of the class data in a classified relation, and considerd as omitted in the class data "table" as the result of succession of the variable of the present invention. On this subject description is made later at the explanation on image processing means 809, as well as the method "CalcZoomRatio" described by the highest class data likewise.

On the contrary, as default_bg of the class data "table" in FIG. 10 is already initialized in class data, it is not necessary, for the image parts belonging to class data "table", to appoint concrete data anew, exept under some special situation. If special appointment is necessary, description is:

(default_bg (C#garden in))

Thus, the explanation of an embodiment of the image data storing-managing means 805 according to the present invention ends.

In the following, referring to FIG. 8, procedure and flows thereof in various means in the image editing apparatus according to the present invention are explained with:

There is an apple on the table which is in the room. (5)

as an example of input.

First, the example sentence (5) is input by the language input means 806, and transferred to the parsing means 807. As the language input means 806, a keyboard for instance is used.

Figure 18:
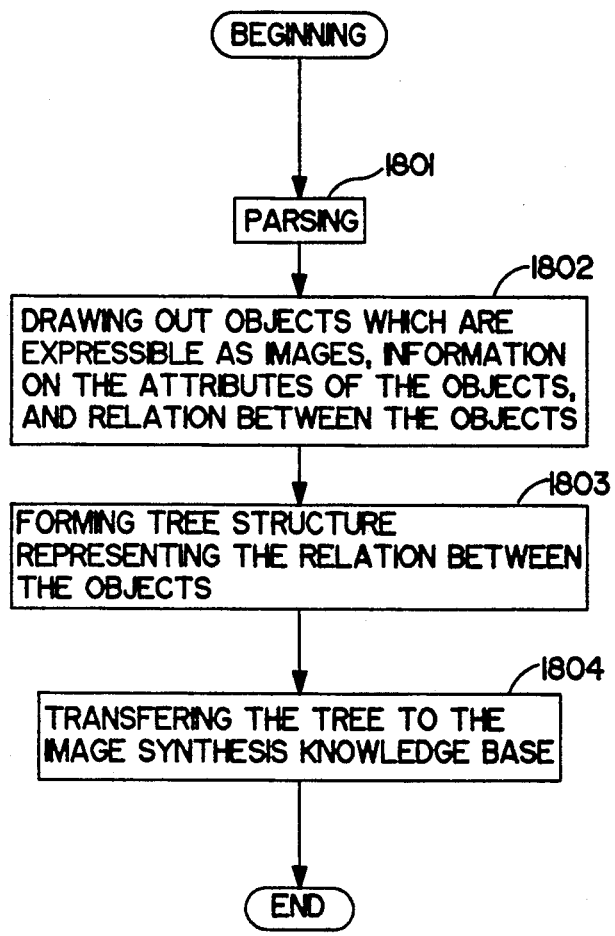
FIG. 18 is a flow chart showing the process in a parsing means.

In the parsing means 807, information for synthesizing automatically the image from the input sentence is retrieved and formed, and stored in the image editing data storing means 812. The procedure in the parsing means 807 is explained below with reference to the FIG. 18, showing the procedure in flow chart.

First, the parsing of the input sentence is made (Step 1801) with a parsing dictionary 801, and objects wihich is expresible as image, information which shows the attributes thereof, and relation between the objects are drawn out (Step 1802). For the parsing (Step 1801), Definite Close Grammer for example may be used.

The judgement of possibility of expressing as image the noun drawn out by the morphological analysis according to the present invention may be done by checking whether the image retrieving data 903 having the image retrieving ward coinciding with the noun is registered in the image retrieving dictionary 802. That is, if the image retrieving data 803 having the image retrieving word coinciding with the noun is registerd in the image retrieving dictionary 802, the noun is determined to be pictorially expressible. As for the relation between the objects drawn out in the parsing means 807, various types can be thought of. In the present embodiment, however, a case dealing with the positional relation and one dealing with the movement are shown. The positional relation has as its basic data structure the triple set;

(object positional relation object), which shows that the object of the third article lies at the position of the second term with referrence to the object of the first term. Also, the movement relation, likely as the positional relation, has as its basic data structure the triple set;

(object movement relation object)

which shows that the object of the third term does the movement of the second term against the object of the first term. In the follwing, this data structure is called the basic relation list. The basic relation list which was drawn for the sentence (5) is ((C#room in C#table)

(C#table on C#apple)), which shows that the position of "table" with referrence to "room" is "in", and that of "apple" with referrence to "table" is "on". When an attribute information to modify the object is given in the input sentence, it is drawn out at the same time in this procedure. For instance, for the sentence "There is a green apple on the table which is in the room", the basic relation list drawn out is:
((C#room in (C#table (shape round)))
(C#table on (C#apple (color green))))

As is observed, in the basic relation list the attribute information is expressed combined with the object. In passing, from C#table in the second basic relation list, attribute information is omitted since it is the same as that in the first list. If the object is different, it is distinguished by newly giving the attribute information. For example, for the sentence "There are a green apple on the right of a round table, and a red apple on the left of the round table.", the drawn out result of the basic information list is as follows;
(((C#table (shape round)) right (C#apple (color green)))
(C#table left (C#apple (color red))))

Figure 19:
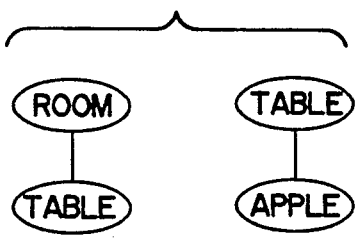
FIG. 19 is a diagram showing a basic tree of an example of the image editing apparatus.

Next, from the basic relation list drawn out by the above procedure, a tree structure representing, the objects and the relation therebetween is formed (Step 1803). The tree is formed, by representing, on all the basic relation list drawn out as above described, the objects and relations by node and link, respectively (This is called the basic tree), and repeating the process to unify the node representing the same object together until the tree becomes one. If there is any attribute information to modify the object, it is described in the node representing the object as well. The basic relation list drawn out from the sentence (5) is transformed to a basic tree as shown in FIG. 19. As the node representing "table" is included in both the basic trees, they are put together to one. Thus, obtaining only one tree, the tree forming procedure ends.

The tree is transferred to the image synthesis knowledge base 812 (Step 1804), to finish the procedure in the parsing means 807.

Returning to FIG. 8; in the image retrieving means 808, the class data, in which the data on the object are described, and the image part, which represents the object, are retrieved. In the procedure, the class data in which the object data are described are retrieved using the name of the object of each node of the tree memorized in the image synthesis knowledge base 812 as the key word. The image parts representing the object and the method to process them are described in the class data, to be referred to. The retrieving is done by searching in the image retrieving dictionary 802 an image retrieving data which has the image retrieving word coinciding with the keyword, and following up the pointer appointed by the image retrieving data. IN the tree in FIG. 20, "room", "table", and "apple" are included as nodes, so that, using these as the keyword, the class data can be traced in the image retrieving dictionary 802. All the class data retrieved are transferred to the image synthesis knowledge base 812. In parsing, if the attribute in formation for modifying the object is described in each node, likelyhood showing the degree of coincidence of the retrieved image parts representing the class of the class data to the input attribute can be estimated. For that purpose, the method described in Japanese patent application No. Hei 3-255025 for example is applied. Thus, the procedure in the image retrieving means 808 is over.

Referring to FIG. 8, again, the procedure in the image processing means 809 is explained. In the image processing means 809, the processing of the image parts retrieved in the image retrieving means 808 is carried out. FIG. 21 shows the flow of procedure in the image processing means 809. Now, the method "CalcZoomRatio" declared in the class data ranked to top, and the method to calculate magnitude of enlarging or reducing each image part are explained, referring to FIG. 21, and using the tree in FIG. 20 made for the sentence (5), which was used in the explanation of the language parsing means 807.

Figure 15:
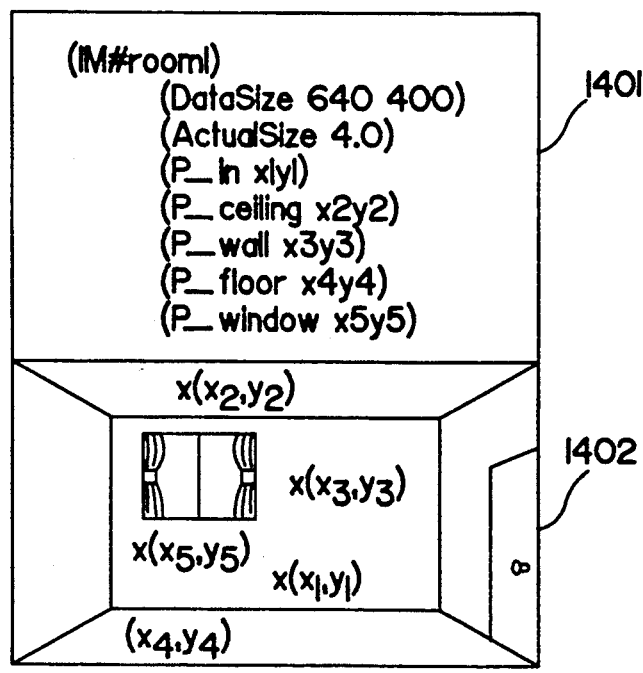
FIG. 15 is a diagram showing general idea of an image part "room".
Figure 16:
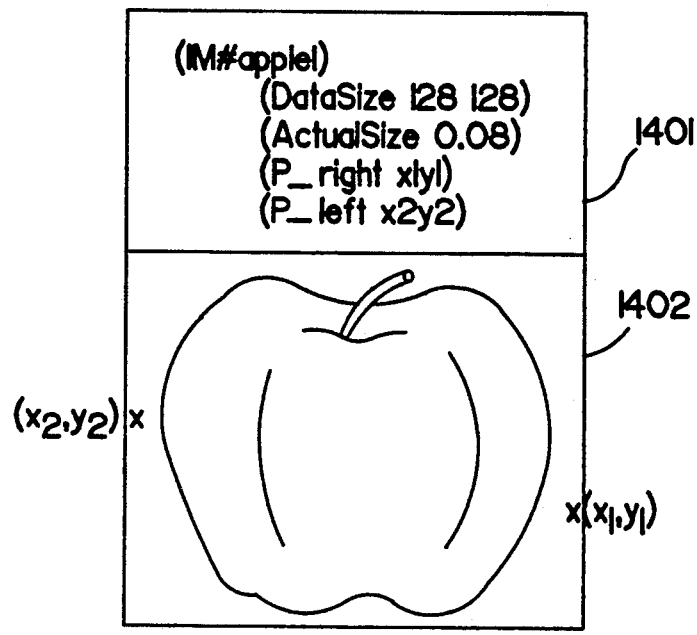
FIG. 16 is a diagram showing general idea of an image part "apple".
Figure 17:
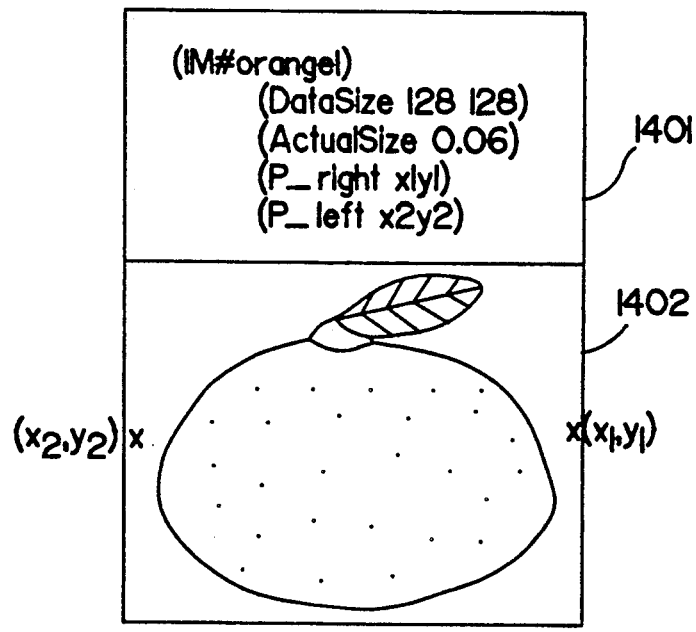
FIG. 17 is a diagram showing general idea of an image part "orange".
Figure 20:
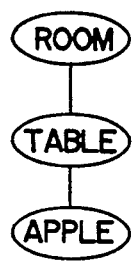
FIG. 20 is a diagram showing a tree of an example of the image editing apparatus.

To the begin, one image part which represents the class of root node of tree is selected, and the data-size of the image part is denoted by Xs and Ys, and the actual-size by S (Step 2101). Since the root node of the tree is "room" from FIG. 20, if, as the image parts belonging to it, those in FIG. 15 are used, Xs=640
Ys=400
S=40 are obtained. Also, assuming n as the number of nodes other than the root node of the tree, the nodes are given number from one to n (Step 2102). In FIG. 20, as the number of nodes other than the root node of the tree is 2, n=2 and nodes "table" and "apple" are given number 1 and 2 respectively.

Then, putting i=1 (Step 2103), an image part expressing the concept of the i-th node is selected, and data-size and the actual-size of the image part are denoted by Xd, Yd and D, respectrively (Step 2104). As, in this case, i=1, using the image part in FIG. 14 as the first node i.e. the image part representing the concept of "table", Xd=256
Yd=128
D=1.0

And, with respect to a image part representing the class of root node of a tree the magnitude of enlarging or reducing other image part representing the concept of the i-th node is calculated by a formula as given in FIG. 22 in the method "CalcZoomRatio". In the formula, $r_{max}$ and $r_{min}$ are the threshold value to modify when the value of $r_{cal}$ is too large or too small, and if $r_{cal} > r_{max}$, $r_{cal}$ is replaced by $r_{max}$, and if $r_{cal} < r_{min}$, $r_{cal}$ is replaced by $r_{min}$. For that purpose, $r_{max}$ and $r_{min}$ are given appropriate value beforehand. As i=1 now, calculation of magnitude $r_1$ of enlargeing and reducing of "table" with reference to "room" results in $r_1 = 0.7$.

Further, the data_size of the image part representing the concept of the i-th node and the attribute of the Position type variable are multiplied by $r_i$, and, as for the image element data, the length and breadth are both multiplied by $r_i$ as well (Step 2106). Here the following transformation of data for the image parts representing the concept of "table" is applied.

| (data_size | 256*0.7 | 128*0.7) |
|---|---|---|
| (P_on | x1*0.7 | y1*0.7) |
| (P_under | x2*0.7 | y2*0.7) |
| (P_right | x3*0.7 | y3*0.7) |
| (P_left | x5*0.7 | y5*0.7) |

Now, as i<n (Step 2107), i is increased by 1 (Step 2108) (that is, i becomes i=2), and, returning to Step 2104, similar procedure is applied, that is, the magnification $r_2$ of enlarging or reducing the image part of "apple" with referrence to the image part of "room" is calculated. When it is over, judging i<n (Step 2107) proves that it is not satisfied, and the procedure in the image processing meams 109 is finished.

Figure 23:
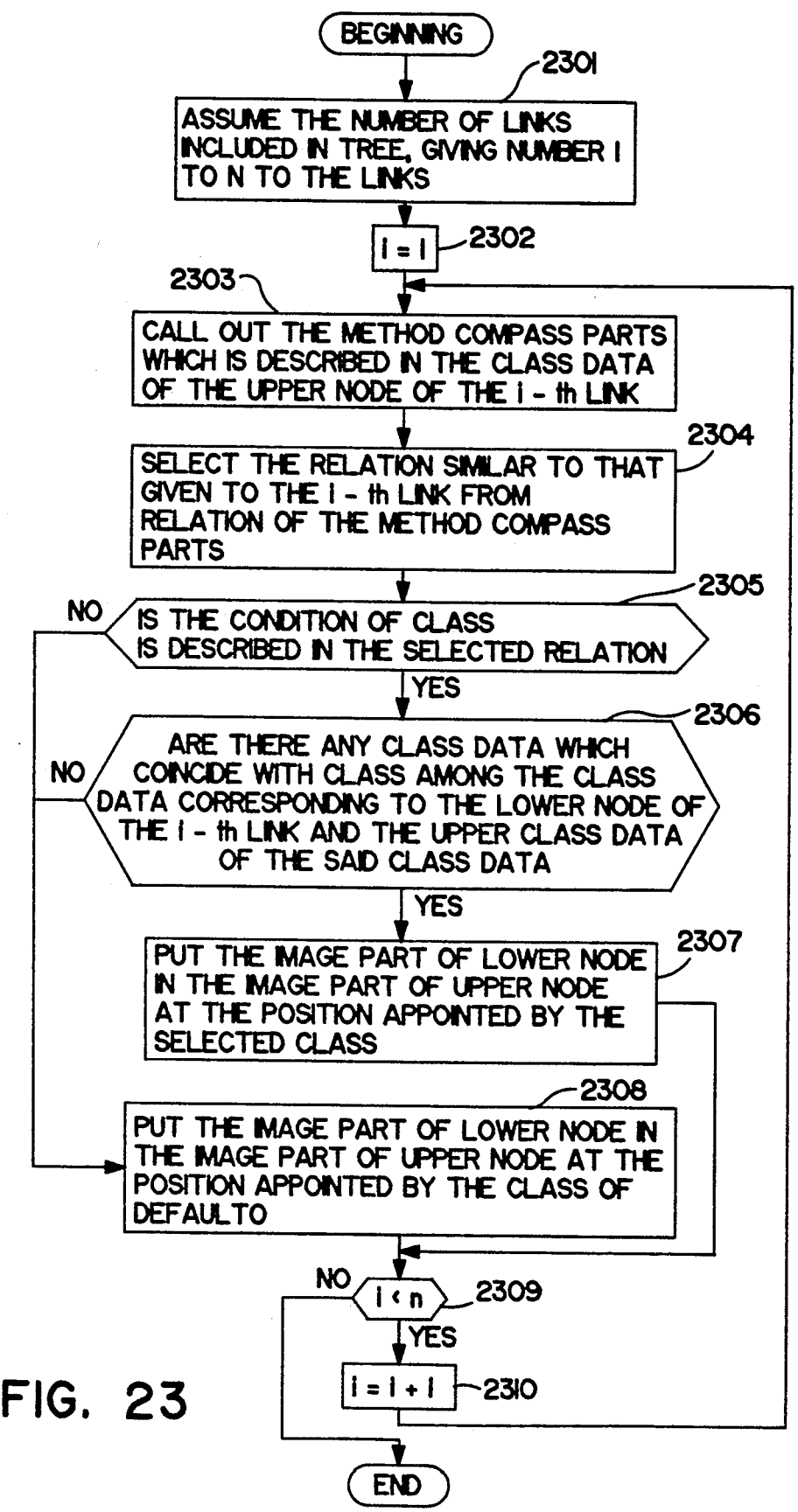
FIG. 23 is a flow chart showing flow of procedure in the image synthesizing means.

Referring again to FIG. 8, the procedure in the image synthesizing means 810 is explained. In the image synthesizing means 810, the synthesis of the image parts processed previously in the image processing means 809 is performed. FIG. 23 shows the flow of the procedure in the image synthesizing means 810.

Referring to FIG. 23, method "ComposeParts" declared at each class data, and method of calculating the magnification of enlarging or reducing each image parts using Position type attributes of each image parts is explained. Use is made of the tree in FIG. 20 which was formed for the sentence (5) in the explanation for the parsing means 807.

First, assuming the number of links included in the tree to be n, the links are given number 1 to n (Step 2301). In the case of FIG. 20, where the number of links included in the tree is 2, n=2, so that the link connecting the node "room" and node "table" is denoted by the first link, and the link connecting the node "table" and the node "apple" by the second link.

Next, putting i=1 (Step 2302), the method "ComposeParts" which is described in the class data of upper node of the i-th link is called out (Step 2303). In the present cuse, the method Compose Parts described in "room" or the class data of upper node of the first link is called out. And, the relation same as that given to the first link is selected from the Relation in the method "ComposeParts" (Step 2304). As, in FIG. 20, the relation given to the first link of the tree is "in", the same relation is selected from the Relation of method "ComposeParts" of "room". Now, it is inspected whether the condition of class is described in the selected Relation (Step 2305), and, if it is done, the class coinciding with the lower node of the i-th link or the upper class is selected from the "Class" (Step 2306), to be proceeded to Step 2307. If it is not, Class default is selected to proceed to Step 2308. In case of Relation "in" of the method "ComposeParts" of "room", inspection of the description of Class coinciding with "table" or its upper concept shows existence of the description in the third term, so that it is selected.

Lastly, the image part of lower rank is put at the position in the image part of upper node of the i-th link as appointed by the class seleted at Step 2306 (Step 2307, 2308). In the Class default selected now by the position of "table" with reference to "room" is appointed to be P_in, so that the image part of "table" is placed at the P_in position of the image part of "room".

Now, as i<n (Step 2309), i is increased by one (i.e. i=2) (Step 2310), and, returning to Step 2303, the similar procedure is applied, that is, the image part of "apple" is arranged with reference to the image part of "table". When it is finished, i<n is judged (Step 2309) to be found not satisfied, and the procedure in the image synthesizing means 810 ends.

Last of all, the image synthesized in the image synthesizing means 810 is displayed by the image displaying means 811, to finish the all procedure of the image editing apparatus according to the present invention.

The above described image retrieving means 805, image processing means 809, and image synthesizing means 810 are collectively named the image editing means.

For referring data necessary for the retrieving, processing and synthesizing in the image editing apparatus, use is not made of the data stored in the image data storing-managing means 805, but is made of the data stored in the image editing data storing means 812. The intention is to make rapid data reference, even if the stored information in the image data storing-managing-means 805 becomes tremendously large.

Figure 24:
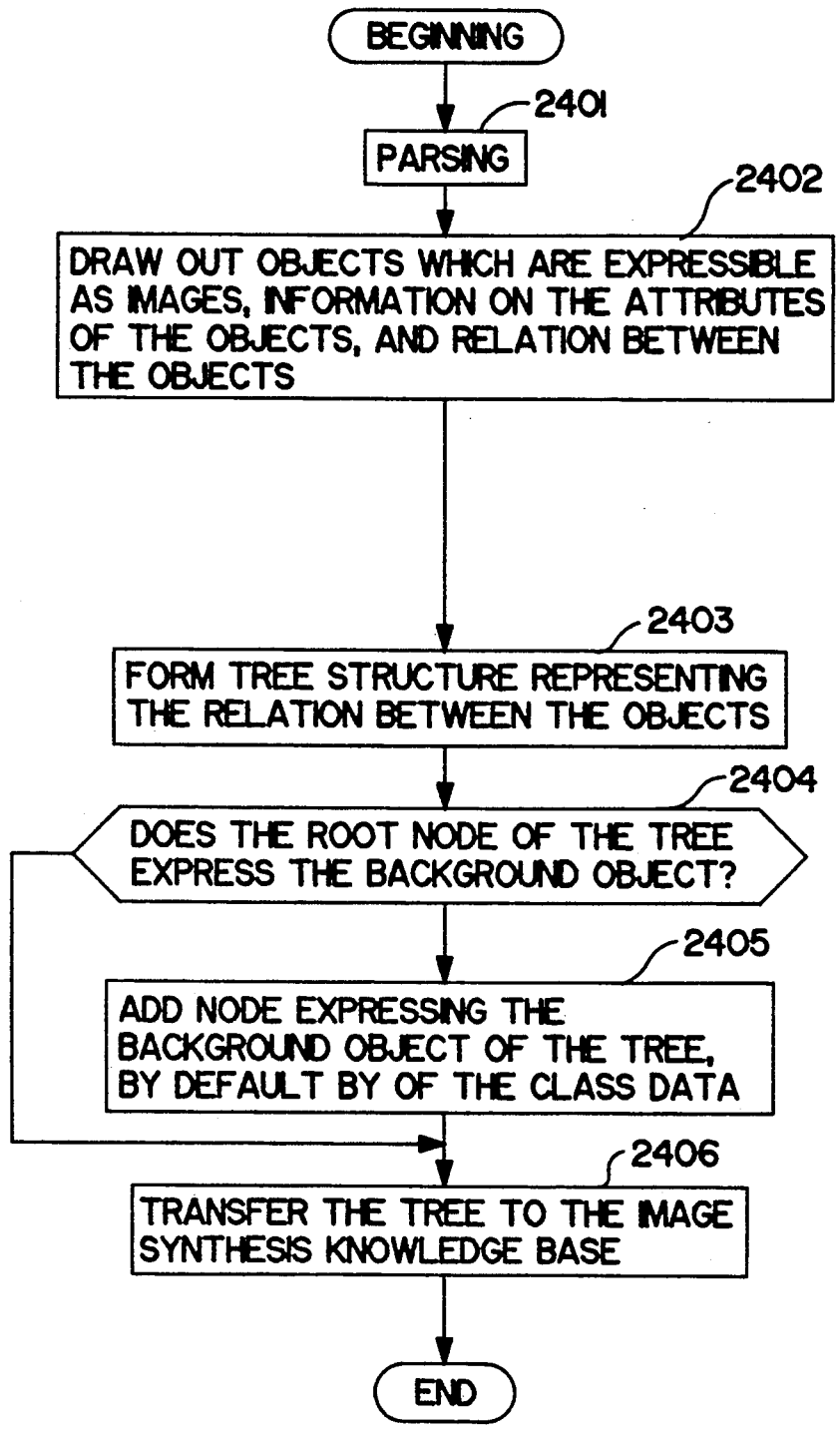
FIG. 24 is a flow chart showing procedure for supplimenting omission in the language parsing means.

The image editing apparatus according to the present invention makes it possible, in "case where the object representing the background is omitted" in the sentence being input, to supplement by the language parsing means 807, FIG. 24 shows in the flowchart form the above procedure together with the procedure in the language parsing means 807 shown in FIG. 18. In the following, referring to FIG. 24, the procedure to supplement is explained on a sentence:

"There are an apple and orange on the table" (6)

First, in the language parsing means 807, the following two basic relation lists are drawn out from the sentence (6) by use of parsing (Step 2401, 2402).

(table on apple)
(table on orange)

Figure 25:
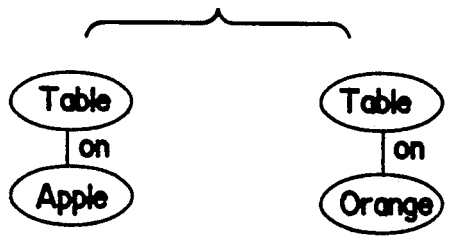
FIG. 25 is a diagram showing general idea of a basic tree in an example of the image editing apparatus.
Figure 26:
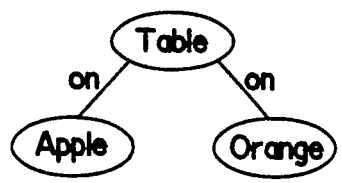
FIG. 26 is a diagram showing general idea of a tree in an example of the image editing apparatus.
Figure 27:
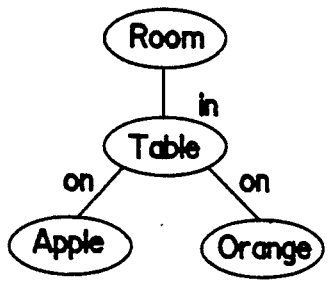
FIG. 27 is a diagram showing general idea of a tree in an example of the image editing apparatus.

Then, the basic tree is formed by the parsing means 807 (FIG. 25) from the basic relation list modified previously, and the tree is obtained.(Step 2403) (FIG. 26).

Now, since the image part expressing the root node thus formed is the base to determine the position of the image parts of other nodes in the image synthesizing means 810, the object of the root node must be the one which expresses the background object. In the image editing apparatus according to the present invention, DefaultBG type variable defanlt_bg (1011) which distinguishes, whether the class expessed by the class data is the background object or the foreground object is described in the class data, and, with the variable, it is made possible to judge whether the object of the root node is the background object or not, and, if it is not, to add further to the tree the node to express the background object.

Following are the details of the method therefor. First, it is inspected, in class data coresponding to the root node of the tree formed in the language parsing means 807, whether the "DefaultBG" type variable is declared or not (Step 2404). If it is not, the root node expressing the background object, the tree as it is transferred to the image editing data storing means 812 (Step 2406). If it is declared, the root node being found to express the foreground object, a node to express the background object is to be added to the tree as a root node. The addition of the node expressing the background object is made referring the initial value given to the "DefaultBG" type variable default_bg (1011) of the calss data corresponding to the root node of the tree. That is, the first term of the default_bg is assigned to the upper node of the root node, and the second term is given to the link which connects the above two nodes (Step 2405).

Application of the above procedure to the tree of FIG. 26. made from the sentence (6) is as follows. First, the object of the root node of the tree is found to be "table". As the class data "table" in FIG. 10 describes (DefanltBG (default_bg (C#room in))), showing that "table expresses an foreground object, the tree in FIG. 26 must be supplemented by a node which is to be a background object. Since, in class data "Table", the background object and the position of "table" is appointed "in" of "room" by default_bg, "room" is added to the tree in FIG. 26 as the upper node of the root node and positional relation "in" is added to the link connecting the above two nodes. Thus, an input sentence with the background object omitted can be supplenmented.

According to the present invention, by inputting the contents of the intended image by natural language, procedure to edit the image is carried out all automatically, so that the image editing, which required much labor, can be finished in a short time. Also, as the input is made by natural language, no special input apparatus as mouse other keyboard is necessary and anybody can easily edit an image. Further, if the image automatically synthesized with the input of natural language needs another editing later, it is possible to quickly exchange the object forming the synthesized image with other image part, since the image parts related to the image editing are all once retrieved and stored.

What is claimed is:

1. An image editing apparatus comprising:
   a first storing means to store information of simple words which form a linguistic sentence, and information on relation of meaning between the simple words,
   a second storing means to store information solely on attributes of images or image information on attributes of images and data of image elements combined,
   a third storing means to store the grammer of the language,
   a fourth storing means to store the relation between the information stored in the first storing means and the information stored in the second storing means, if any relation exists,
   a fifth storing means to store image editing rule to edit images using the result of parsing of the language and the image attribute,
   a linguistic sentence input means to input a linguistic sentence,
   a linguistic sentence parsing means to parse a linguistic sentence using the informations stored in the first and third storing means,
   an image retrieving means to retrieve image information from the second storing means using the parsing result of the linguistic sentence parsing means and the information stored in the first and fourth storing means,
   a displaying means to display the image element data stored in the second storing means, and
   an image editing means to conjecture, using the parsing result of the linguistic sentence, the retrieved image information, and the information stored in the fifth storing means,
whether the editing of the meaning of the input linguistic sentence to an image is possible, and in case it is possible, to process and synthesize the retrieved image to edit an image showing the meaning of the input sentence.

2. An image editing apparatus comprising:
   first storing means for storing information relating to simple words which form a linguistic sentence in a language, and for storing information on relation of meaning between the simple words, second storing means for storing information solely on attributes of images or image information on attributes of images and data of image elements combined, third storing means for storing the grammer of the language, fourth storing means for storing the relation between the information stored in the first storing means and the information stored in the second storing means, if any relation exists, fifth storing means for storing image editing rule to edit images using the result of parsing of the language and the image attribute, linguistic sentence input means for receiving the linguistic sentence, linguistic sentence parsing means for parsing the linguistic sentence using the informations stored in the first and third storing means, image retrieving means for retrieving image information from the second storing means using the parsing result of the linguistic sentence parsing means and the imformation stored in the first and fourth storing means, displaying means for displaying the image element data stored in the second storing means, and image editing means for conjecturing, using the parsing result of the linguistic sentence, the retrieved image information, and the information stored in the fifth storing means, whether the editing of the meaning of the input linguistic sentence to an image is possible, and in case it is possible, to process and synthesize the retrieved image to edit an image showing the meaning of the input sentence, wherein the image information stored in the second storing means has as its image attribute the first instance value to distinguish between the background imnage and image part, the second instance value to distinguish whether the image is edited one or not, and the third instance value to describe the physical size of the object displayed.

3. An image editing apparatus according to claim 2, wherein the image information stored in the second storing means when the second instance value shows the image to be an edited one, has not any image element data, but has fourth instance value which describes the method to process and synthesize the plural not-yet-edited images information used for editing.

4. An image editing apparatus comprising:

first storing means for storing information of simple words which form a linguistic sentence in a language, and information on relation of meaning between the simple words, second storing means for storing information solely on attributes of images or image information on attributes of images and data of image elements combined, third storing means for storing the grammer of the language, fourth storing means for storing the relation between the information stored in the first storing means and the information stored in the second storing means, if any relation exists, fifth storing means for storing image editing rule to edit images using the result of parsing of the language and the image attribute, linguistic sentence input means for receiving the linguistic sentence, linguistic sentence parsing means for parsing the linguistic sentence using the informations stored in the first and third storing means, image retrieving means for retrieving image information from the second storing means using the parsing result of the linguistic sentence parsing means and the information stored in the first and fourth storing means, displaying means for displaying the image element data stored in the second storing means, and image editing means for conjecturing, using the parsing result of the linguistic sentence, the retrieved image information, and the information stored in the fifth storing means, whether the editing of the meaning of the input linguistic sentence to an image is possible, and in case it is possible, to process and synthesize the retrieved image to edit an image showing the meaning of the input sentence, wherein the apparatus is further provided with an image revise means to modify the image by hand working, with which, if necessary, the image edited and displayed by the input sentence can be modified.

5. An image editing apparatus comprising:

a parsing dictionary, storing information necessary to understand a linguistic sentence, an image storing-arranging means to store and arrange image parts and method to process the image parts, a language input means to have input of linguistic sentence, a parsing means to parse the linguistic sentence, using the parsing dictionary and the information stored in the image data storing-arranging means, an image editing means to retrieve, with the parsed result of the linguistic sentence, image parts necessary for expressing the contents of the linguistic sentence and method to process the image parts, by the image data storing-arranging means, and a displaying means to display the synthesized image parts.

6. An image editing apparatus comprising:

a parsing dictionary, storing information necessary to understand a linguistic sentence, image storing-arranging means for storing and arranging image parts and a method to process the image parts, language input means for receiving the linguistic sentence, parsing means for parsing the linguistic sentence, using the parsing dictionary and the information stored in the image data storing-arranging means, image editing means for retrieving, from the parsed result of the linguistic sentence, image parts necessary for expressing the contents of the linguistic sentence and method to process the image parts, by the image data storing-arranging means, and a displaying means to display the synthesized image parts, wherein the image part consists of description part of the instance value and image element data, and the method in the image data storing-arranging means is characterized by the use of the instance value as parameter.

7. An image editing apparatus according to claim 6, wherein the image data storing-arranging means comprises a class data management system and an image data base, the class data arranging part collecting the description part of the class name of pointer to express the instance of the class, of the method to process the image part and of variable necessary for the said method, and the image data base collecting image parts, and the image data storing-arranging means further describes in the said class data the method to process the image parts appointed by the pointer of class data.

8. An image editing apparatus according to claim 7, wherein the image data storing-arranging means is further provided with image retrieving dictionary collecting description part consisting of retrieving word and a pointer to appoint the class data representing the class of the image retrieving word, and the pointer of all the retriving word expressing the similar class appoints one class data representing the said class.

9. An image editing apparatus according to claim 7, wherein the class data has description part of pointer appointing class data expressing the upper class and class data expressing the lower class, transfers the method and variables described in class data to lower class data appointed by the pointer, and, if necessary, following the pointer to the upper class to refer to the method and variable of the upper class data.

10. An image editing apparatus according to claim 7, wherein the parsing means has a means to draw out from the parsing result of linguistic sentence an object which is possible to be expressed in image, information which shows the instance of the object, and relation between the object, to represent by node the object which is possible to be expressed in image, and by link the relation between the objects, and to form a tree structure connecting the bothe nodes by the link representing the relations, while putting the other object having any relation with referenon to the object lower node of the said node.

11. An image editing apparatus according to claim 10, wherein the image part describes concrete value for the variable declared in the above class data, in the description part of instance value of an image part appointed by the pointer apointing the said image part.

12. An image editing apparatus according to claim 11, wherein the varible of Class data is formed of description part of type of variable, name, and initial value, and, when an initial value is given to an variable described by a class data having a pointer to appoint the said image part, omits, if not necessary, to describe concrete value corresponding to the said variable in the image part appointed by the said pointer of class data.

13. An image editing apparatus according to claim 12, wherein the class data include at least a variable to distinguish which of the background and object is represented, and the language parsing means has a means to distunguish which of the concept of background and concept of object the class data expresses by the said variable.

14. An image editing apparatus according to claim 13, wherein the class data expressing the foreground object describes, as the initial value, of a variable to distinguish which of the background object and foreground object is expressed, other class data to represent the background object in which the said foreground object exist and the relation between the background object and foreground object, and, further, the language parsing means has a means to form, when the object of node of root of tree formed by inputting linguistic sentence is found to be the foreground object, a tree supplemented with a node to represent the background object and a link to connect the node and the node of the said tree, using the said initial value.

15. An image editing apparatus according to claim 11, wherein the image editing means comprises:
an image retrieving means to retrieve, using the information representing the object which is possible to be expressed by image and the instance of the object, the image part representing the object and method to process the image part from the image data storing-arranging means, an image processing means to process the image part in accordance with the said method, and an image synthesizing means to synthesize the image parts according to the said method.

16. An image editing apparatus according to claim 15, wherein the class data includes at least a variable to described the size of image element of the image parts appointed by the pointer of the class data and the size of the object represented by the image part, and a method to process the image part using the said variable, and image processing means has a means to process, according to the said method the image part representing the object of each nodes of the tree formed by the languistic parsing means with linguistic sentence input.

17. An image editing apparatus according to claim 15, wherein the class data include at least a variable to describe positional relaion which is appointed to the object expressing the class data, and method to carry out synthesizing of the image parts using the said variable, and the image synthesizing means synthesizes the image parts which express the object of each node of the tree made by the languistic parsing means with linguistic sentence input, using the relation of the link of the tree and the said method.

18. An image editing apparatus comprising:
a parsing dictionary, storing information necessary to understand a linguistic sentence,
image storing-arranging means for storing and arranging image parts and method to process the image parts,
language input means for receiving the linguistic sentence,
parsing means for parsing the linguistic sentence, using the parsing dictionary and the information stored in the image data storing-arranging means,
image editing means for retrieving, from the parsed result of the linguistic sentence, image parts necessary for expressing the contents of the linguistic sentence and method to process the image parts, by the image data storing-arranging means, and a displaying means to display the synthesized image parts,
which is further provided with an image synthesis knowledge base to store temporarily information parsed by the linguistic parsing means and information retrieved by the image retrieving means, and carries out process in the image editing means using the information stored in the said image editing data storing means.

19. A method of editing an image which includes a plurality of image parts, comprising the steps of:
storing information necessary to understand an input linguistic sentence,
storing and arranging said plurality of image parts;
receiving said input linguistic sentence,
parsing the input linguistic sentence, using the information necessary to understand the linguistic sentence and said plurality of image parts to obtain a parsed result of said input linguistic sentence;

retrieving from the parsed result of the linguistic sentence a further plurality of image parts necessary for expressing contents of the input linguistic sentence; and processing and displaying said further plurality of image parts.

20. The method of editing an image according to claim 19, wherein the image parts have respective attributes and the step of processing said further plurality of image parts uses the respective attributes of the image parts to create a reasonably accurate multi-dimensional image.

21. The method of editing an image according to claim 19, wherein the step of processing said further plurality of image parts is performed in accordance with an image editing rule.

* * * * *

UNITED STATES PATENT AND TRADEMARK OFFICE
CERTIFICATE OF CORRECTION

PATENT NO. : 5,317,508
DATED : May 31, 1994
INVENTOR(S) : Shusaku Okamoto et al.

It is certified that error appears in the above-identified patent and that said Letters Patent is hereby corrected as shown below:

column 17, line 40, claim 2, after "ground" the word "imnage" should be --image--.

column 18, line 47, claim 6, after "image" insert data--.

column 18, line 32, claim 5, before "linguistic" insert input--.

column 20, line 18, claim 16, "described" should be describe--.

column 20, line 18, claim 16, "parts" should be part--.

column 20, line 21, claim 16, after "and" insert --the--.

UNITED STATES PATENT AND TRADEMARK OFFICE
CERTIFICATE OF CORRECTION

PATENT NO.    : 5,317,508
DATED         : May 31, 1994
INVENTOR(S)   : Shusaku Okamoto et al.

It is certified that error appears in the above-identified patent and that said Letters Patent is hereby corrected as shown below:

column 20, line 24, claim 16, "object" should be --objects--.

Signed and Sealed this

First Day of November, 1994

*Attest:*

BRUCE LEHMAN

*Attesting Officer*    *Commissioner of Patents and Trademarks*